(12) United States Patent
Leppisaari et al.

(10) Patent No.: US 7,991,895 B2
(45) Date of Patent: Aug. 2, 2011

(54) LIMITING ACCESS TO NETWORK FUNCTIONS BASED ON PERSONAL CHARACTERISTICS OF THE USER

(75) Inventors: Arto Leppisaari, Kangasala (FI); Adamu Haruna, Tampere (FI)

(73) Assignee: Nokia Corporation, Espoo (FI)

( * ) Notice: Subject to any disclaimer, the term of this patent is extended or adjusted under 35 U.S.C. 154(b) by 429 days.

(21) Appl. No.: 11/298,970

(22) Filed: Dec. 9, 2005

(65) Prior Publication Data
US 2007/0136475 A1    Jun. 14, 2007

(51) Int. Cl.
G06F 15/16    (2006.01)
(52) U.S. Cl. ....................................... 709/227; 709/228
(58) Field of Classification Search ................... 709/228, 709/229, 232, 219, 203, 231, 159
See application file for complete search history.

(56) References Cited

U.S. PATENT DOCUMENTS

| | | | |
|---|---|---|---|
| 5,845,281 A | | 12/1998 | Benson et al. |
| 5,889,958 A | * | 3/1999 | Willens .......................... 709/229 |
| 6,522,876 B1 | * | 2/2003 | Weiland et al. ............. 455/414.1 |
| 6,704,787 B1 | * | 3/2004 | Umbreit ........................ 709/229 |
| 7,043,230 B1 | * | 5/2006 | Geddes et al. ................ 455/410 |
| 7,478,159 B2 | * | 1/2009 | Hurtta et al. .................... 709/227 |
| 7,668,149 B2 | * | 2/2010 | Zhao et al. ..................... 370/349 |
| 7,684,805 B2 | * | 3/2010 | Zhao et al. ..................... 455/448 |
| 7,685,295 B2 | * | 3/2010 | Myers et al. ................... 709/228 |
| 7,725,589 B2 | * | 5/2010 | Nicodemus et al. .......... 709/229 |
| 2003/0149774 A1 | * | 8/2003 | McConnell et al. .......... 709/227 |
| 2003/0149781 A1 | * | 8/2003 | Yared et al. .................... 709/229 |
| 2004/0186918 A1 | * | 9/2004 | Lonnfors et al. .............. 709/250 |
| 2004/0249951 A1 | * | 12/2004 | Grabelsky et al. ............ 709/227 |
| 2005/0086541 A1 | | 4/2005 | Rajaniemi |
| 2005/0097188 A1 | * | 5/2005 | Fish ............................... 709/217 |
| 2005/0190740 A1 | * | 9/2005 | Zhao et al. ..................... 370/349 |
| 2005/0233776 A1 | * | 10/2005 | Allen et al. .................... 455/567 |
| 2005/0276268 A1 | | 12/2005 | Poikselka |
| 2006/0031294 A1 | * | 2/2006 | Poikselka ...................... 709/204 |
| 2006/0161616 A1 | * | 7/2006 | I'Anson et al. ................ 709/203 |
| 2006/0235981 A1 | * | 10/2006 | Westman et al. .............. 709/227 |
| 2006/0294243 A1 | * | 12/2006 | Kuure et al. ................... 709/227 |
| 2007/0002779 A1 | * | 1/2007 | Lee et al. ....................... 370/260 |

FOREIGN PATENT DOCUMENTS

EP    1 566 945 A1    8/2005
(Continued)

OTHER PUBLICATIONS

Oct. 6, 2005, Open Mobile Alliance, "Enabler Release Definition for XML Document Management", Version 1.0, Oct. 6, 2005.
Feb. 4, 2005, Open Mobile Alliance, XML Document Management, (XDM) Specification, Version 1.0, Feb. 4, 2005.

(Continued)

*Primary Examiner* — Jeffrey R Swearingen
(74) *Attorney, Agent, or Firm* — Ditthavong Mori & Steiner, P.C.

(57) ABSTRACT

Establishing a data communications session involves determining a personal characteristic associated with a user of a terminal. A predetermined criterion for allowing establishment of the data communications session based on the personal characteristic is obtained. A token is embedded in a signaling message used to establish the data communications session. The token represents at least one of the personal characteristic and the predetermined criterion. The signaling message is communicated with a network entity capable of allowing users to establish the data communications session. The data communications session is established via the network entity if the personal characteristic satisfies the predetermined criterion.

26 Claims, 10 Drawing Sheets

FOREIGN PATENT DOCUMENTS

| | | |
|---|---|---|
| TW | I241097 | 10/2005 |
| TW | I242357 | 10/2005 |
| TW | I242956 | 11/2005 |
| TW | I244295 | 11/2005 |
| WO | WO 2005/098565 A1 | 10/2005 |

OTHER PUBLICATIONS

Jun. 29, 2005, Samsung, "Push to talk over Cellular", Jun. 29, 2005.
Taiwanese Office action for corresponding TW application No. 095143799 dated Feb. 25, 2011, pp. 1-6.

* cited by examiner

US 7,991,895 B2

LIMITING ACCESS TO NETWORK FUNCTIONS BASED ON PERSONAL CHARACTERISTICS OF THE USER

FIELD OF THE INVENTION

This invention relates in general to computer networking, and more particularly to limiting access to network functions based on personal characteristics of the user.

BACKGROUND OF THE INVENTION

Technologies such as instant messaging (IM) have become increasingly popular to users of both mobile and non-mobile computing devices. These messaging technologies allow text and other data (e.g., multimedia content) to be exchanged between network users on a real-time or near-real-time basis. The text-based nature of the communications allows users to exchange thoughts in real-time without the distractions inherent in voice communications. Thus, people can engage in an IM conversation while continuing to do other things, such as work on a computer or listen to a lecture.

Some of the most enthusiastic adopters of IM and related technologies are young people. More young people own IM-capable cell phones or other mobile devices, and IM becomes a convenient yet innocuous way to communicate with friends. In addition, many young people, especially, teenagers, use IM as a way to meet new people, such as in Internet chat rooms or IM chat groups.

The use of IM technologies by young people presents hazards to the participants. It is well known that predators sometimes try to engage in conversation with children on chat rooms. As a result, providers of IM related services must find ways to provide a safe environment for young people to engage in appropriate interactions using data networks. Improving the safety of IM services for children is not only good business practice, but may also be a requirement as laws are developed to help protect children and other vulnerable people who engage in communication over publicly accessible networks. The present disclosure is directed to improvements in safety of communication technologies such as IM.

SUMMARY OF THE INVENTION

To overcome limitations in the prior art described above, and to overcome other limitations that will become apparent upon reading and understanding the present specification, the present invention discloses a system, apparatus and method for limiting session access and filtering user profile and group searches based on personal information of a user.

In accordance with one embodiment of the invention, a method for establishing a data communications session involves determining a personal characteristic associated with a user of a terminal. A predetermined criterion for allowing establishment of the data communications session based on the personal characteristic is obtained. A token is embedded in a signaling message used to establish the data communications session. The token represents at least one of the personal characteristic and the predetermined criterion. The signaling message is communicated with a network entity capable of allowing users to establish the data communications session. The data communications session is established via the network entity if the personal characteristic satisfies the predetermined criterion.

In more particular embodiments, the personal characteristic includes the user's age. The personal characteristic of the user may be obtained from a network accessible user profile database. In one arrangement, embedding the token in the signaling message comprises embedding the token in at least one of an Accept-Contact and a Contact header of a Session Initiation Protocol (SIP) INVITE message. Embedding the token in the signaling message may involve intercepting the session establishment request at an intermediary server and embedding the token in the signaling message via the intermediary server. Establishment of the data communications session may involve any combination of allowing membership into an instant messaging group, allowing membership into a push-to-talk communications group, and/or establishing the data communication session between two or more users.

In another embodiment of the invention, a method for searching for communication endpoints accessible via a network involves determining a criterion related to a personal characteristic of a user. A token is embedded in a signaling message used to initiate the search. The token represents at least one of the criterion and the personal characteristic. A search result is obtained in response to the signaling message. The search result is filtered by excluding endpoints referenced in the search results that do not satisfy the criterion, and the filtered search result is returned to an initiator of the signaling message.

In another embodiment of the invention, a data processing arrangement includes a network interface capable of communicating via a network. A processor is coupled to the network interface, and a memory is coupled to the processor. The memory includes instructions that cause the processor to receive a signaling message from a terminal via the network. The signaling message includes at least one of a personal characteristic of a user of the terminal and a predetermined criterion related to the personal characteristic. A network service is provided to the terminal via the data processing arrangement in response to the signaling message based on whether the personal characteristic satisfies the predetermined criterion.

In a more particular embodiment, the data processing further includes an instant messaging server module. The instructions are configure to establish an instant messaging session between the terminal and at least one other user via the instant messaging module in response to the signaling message if the personal characteristic satisfies the predetermined criterion.

In another more particular embodiment, the data processing further includes a push-to-talk server module. The instructions are configured to establish a push-to-talk session between the terminal and at least one other user via the push-to-talk server module in response to the signaling message if the personal characteristic satisfies the predetermined criterion.

In another more particular embodiment, the data processing further includes a search module configured to provide a search result containing descriptions of individual communication endpoints accessible via the network in response to the signaling message. The instructions are configured to filter individual descriptions of the search result based on whether the descriptions satisfy the predetermined criterion.

In other more particular embodiments the signaling message includes the predetermined criterion, and the instructions are configured to determine the personal characteristic via a user profile database accessible via the network. Alternatively, the signaling message may include the personal characteristic, and the instructions are configured to obtain the predetermined criterion via a database.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

Figure 1:
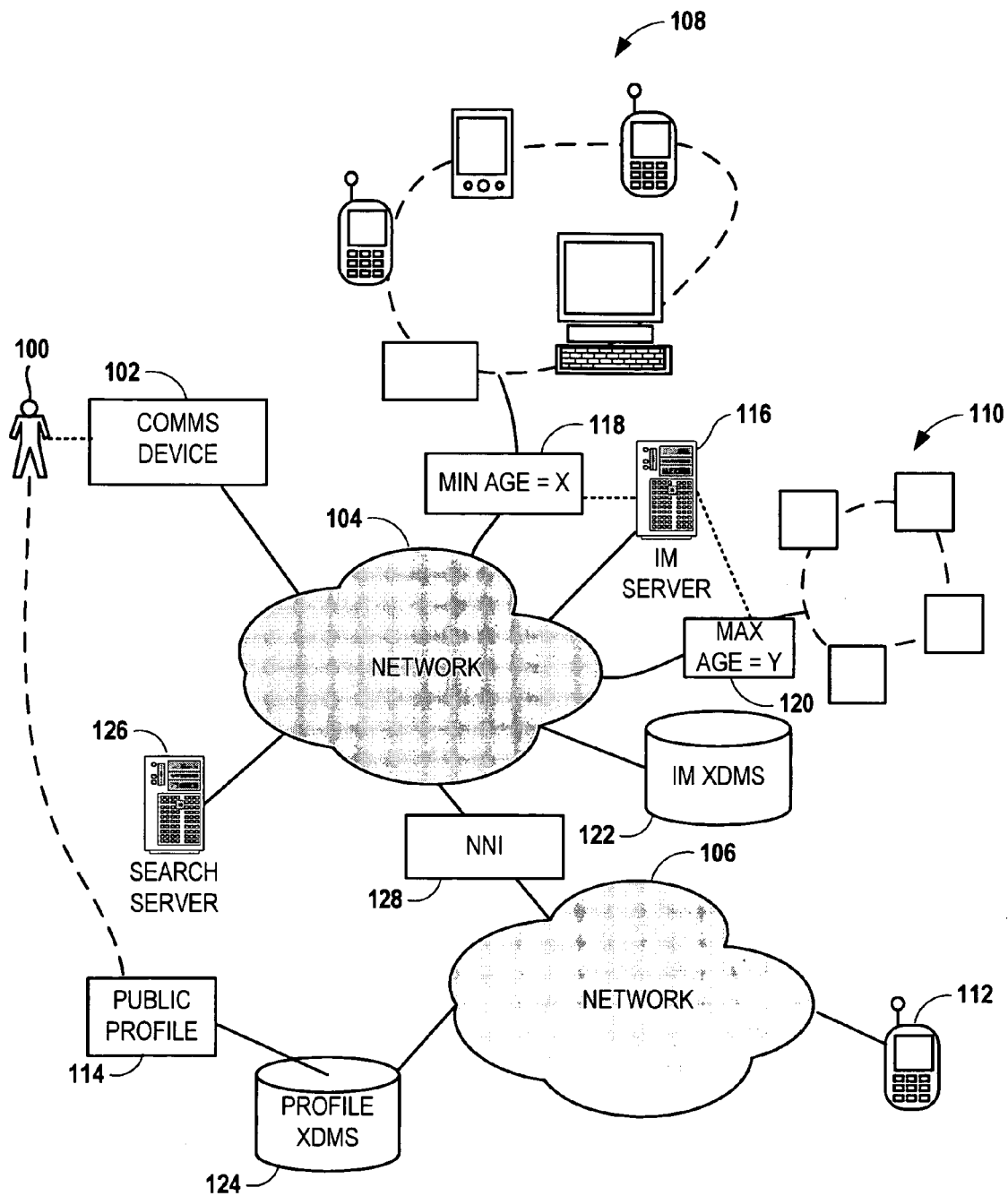
FIG. 1 is a block diagram illustrating a system according to an embodiment of the invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention falls within the area of instant digital communications, such as Instant Messaging (IM) and Push-to-Talk (PTT) over Cellular (PoC). IM services are already deployed using several proprietary technologies and open standards such as Wireless Village. Another IM standard is developing that is built on top the increasingly ubiquitous Session Initiation Protocol (SIP). SIP is a signaling protocol that assists digital devices in establishing end-to-end communications sessions. SIP provides features that resemble those provided by the Public Switch Telephone Network (PSTN) as well as Internet protocols such as Transmission Control Protocol/Internet Protocol (TCP/IP) and Hypertext Transfer Protocol (HTTP).

SIP was initially developed for use with voice and video communications technologies, such as Voice over IP (VoIP). SIP has also been adapted to support services collectively known as Instant Messaging and Presence. In particular, the Internet Engineering Task Force (IETF) has a working group for defining SIP for Instant Messaging and Presence Leveraging Extensions (SIMPLE). SIMPLE is a developing Instant Messaging and Presence standard for using SIP and related technologies for various functions such as transport of messages, delivery confirmation, and communicating presence status of end users. The Open Mobile Alliance (OMA) has chosen SIP/SIMPLE protocol for Instant Messaging and Presence Services. OMA services are utilizing IMS architecture developed by $3^{rd}$ Generation Partnership Project (3GPP).

The objective of OMA SIMPLE IM is to define a complete IM system specification for SIP/IP networks. The features of such an IM system may include: one-to-one and one-to-many one-shot messaging, lists that can be shared with other applications (e.g. PoC or presence), one-to-one session-based messaging, "chatrooms" or messaging conferences, and interoperability with other media (e.g. PoC). One goal of the SIMPLE specification is to keep the system components interoperable with other IETF protocol specifications.

Teenagers are one important user segment for IM services. Due to international laws for child protection, operators are very interested to develop mechanisms for child protection in IM services. Generally, this protection involves allowing or denying access to communication groups based on the user's age. Therefore, OMA SIP/SIMPLE based IM and PoC standards should provide mechanisms for operators to be able to restrict access to services based on user age.

Although the present disclosure describes restricting group admission based on age, it will be appreciated that other personal characteristics may also be used to restrict or allow access. For example, personal characteristics such as gender, location (e.g., city or country), membership in certain social groups, language, interests, etc., may be used to control actions related to joining in communications sessions. These characteristics may be used alone or in any combination. The present invention may also be directed to other communication functions besides admissions. For example, personal characteristics could be the basis for limiting the transmission of certain types of data during the session (e.g., prevent transfer of images or executable files based on age), controlling the formatting of session data (e.g., control character sets used based on native language), determining maximum allowable connect/session times, etc.

The embodiments of the invention may be described herein in the context of SIMPLE-based IM and presence services. Those skilled in the art will appreciate, however, that these concepts may be applied to other IM standards, as well as to other communications frameworks similar to IM. For example, age and other personal characteristics can be used to control access to PTT/PoC groups, voice communications, video teleconferencing, etc.

In reference now to FIG. 1, a block diagram illustrates various concepts associated with modifying network access based on a user's personal characteristics according to embodiments of the invention. Generally, a user 100 has a communications device 102 capable of communicating via one or more data networks 104, 106. One communication service provided by the networks is the capability to form communications groups 108, 110. These groups 108, 110 may allow similar or different devices to intercommunicate using standard media and protocols. For example, the members of the groups 108, 110 may communicate using text messages transmitted via SIMPLE.

The networks may also provide for point-to-point communications, such as a one-to-one session between user terminal 104 and another terminal 112. Whether the user 100 intends to communicate with a single terminal 112 or a group 108, 110, an important aspect is whether to allow the connection to occur. Previously, this determination hinged solely on technical issues (e.g., compatible media and protocols), but may be expanded to limit communications based on personal characteristics, particularly age.

Another important aspect in initiating communications with single terminals 112 or groups 108, 110 relates to the discovery of users and groups. Network users may exchange contact information with acquaintances using traditional means (e.g., via telephone or email). This type of discovery does not necessarily require the use of the communications networks 104, 106 at all. However, it may be advantageous to provide search capabilities via the communications networks 104, 106 so that users may search for other individuals or groups of interest based on keywords or other descriptors.

The OMA SIP/SIMPLE IM uses a general solution for network data access that may be extended for use in search. Data access in SIP/SIMPLE IM is based on eXtensible Markup Language (XML) Document Management (XDM) enabler. The XDM defines a mechanism that makes network-accessible user information available to service enablers such as IM and PoC. This user information is defined in XML documents, and XDM defines protocols and procedures used to locate, access and modify such information via the network. The XDM enablers rely on the XML Configuration Access Protocol (XCAP) as the common protocol for manipulating these XML documents. In addition, XDM utilizes SIP subscription/notification mechanisms for notifying principals of changes to such documents Search mechanisms should be able to take into account personal characteristics of the user 100 in order to limit who can discover the user's identity, as well as whom the user 100 can discover (e.g., based on age). In particular, child protection features should be extended to cover the initiation of IM communication sessions and for user/group search. XDM enablers (or related search frameworks) can achieve this goal by allowing service providers to confine the results of searches based on personal characteristics. For example, the service provider's policy could prohibit searches on children under the age of eighteen. Similarly, if an IM server has age restriction for searching, then the restricting server should exclude those users from the search results who are under the restricted age as determined by their Public Profile 114.

Similarly, it is desirable for a user's personal characteristics to be determined as part of and access policy when joining in chat group or other session. For example, a moderator element such as an IM server 116 should allow group administrators to specify a minimum age requirement for joining chat groups, such as the restriction 118 indicated for group 108. Similarly, the server 116 should prevent those users that are under an age specified in the group properties to join the group, such as the restriction 120 indicated for group 110.

The IM server 116 controls whether new members are able to join chat groups 108, 110. Information on group characteristics (e.g., age limitations for group membership) is in an IM XDM Server (XDMS) 122. An XDMS is a logical repository in the network used for storing XML documents associated with a particular functional entity. Thus, the IM XDMS 122 stores data related to various IM users and groups, and a Profile XDMS 124 stores user profile information (e.g., data that includes user's age). It will be appreciated that the IM server 116 may also define groups for purposes of one-to-one and one-to-many ad hoc sessions. These ad hoc groups may exist only so long as the sessions are active. The concepts described herein related to limiting establishment of such sessions based on age (or other characteristics) also applicable to ad hoc sessions.

In order to determine whether the user 100 may join a group 108, 110 based on age or other personal characteristic, the IM server 116 needs to access both the IM XDMS 122 in order to determine the group policies, as well as a Profile XDMS 124 in order to view the user's public profile 114. Generally, the XCAP allows clients to read, write and modify application configuration data, stored in XML format on a server. XCAP maps XML document sub-trees and element attributes to HTTP URIs, so that these components can be directly accessed by HTTP. Therefore, the IM server 116 can access the IM XDMS 122 and Profile XDMS using XCAP.

Other network entities may also have a need to access various XDMS. In particular, a Search server 126 can use XCAP to access the Profile XDMS 124 and IM XDMS 122 in order to match users with desired groups, and vice versa. The Search server 126 will also need to be aware of age limitations associated with users and groups in order to apply to proper filtering of results.

If operations relating to searching and joining of sessions are all performed in same network (e.g., network 104), the IM server 116 and Search server 126 can access a local Profile XDMS (not shown) and fetch user profiles with age information when required. However, in the illustrated arrangement, the Profile XDMS 124 is located on a different network 106 than the network 104 of the IM server 116 controlling the group sessions. This is a common case when the user 100 is roaming, because the Profile XDMS 124 is located at the home network 106, yet the user's device 102 and/or the groups 108, 110 may be on a different network 104.

The IM server 116 in network 104 may be able to access the Profile XDMS 124 in another network 106 in order to fetch the joining user's user profile 114. In one example, these inter-network data transfers can be accomplished via an XCAP network-to-network interface (XCAP NNI) 128. One problem with this approach is that the NNI 128 is optional, and may not be implemented in all networks. Another problem is that user profile fetching in this way generates an unnecessarily heavy load for that particular interface 128.

A similar problem arises as to the Search server 126. The Search server 126 may need to perform searches on group characteristics (e.g., age limitation for group joining) and user profiles (e.g., containing user's age). However, if the IM XDMS 122 and Profile XDMS 124 are in different networks 104, 106, then the data transfer may either be impossible or place too heavy a burden on the NNI 128.

In one embodiment of the present invention, mechanisms are used to embed the personal information into search request sent between networks. One use of this age information (from the user profile) to limit access to chat groups or limiting of search results, but the presented mechanism can be utilized for other user profile information (e.g., country, city) as well. The personal information can also be embedded in session establishment requests, so that a controlling authority such as the IM server 116 can decide whether to allow access based on the request itself, rather than requiring a separate inter-network profile lookup.

Figure 2:
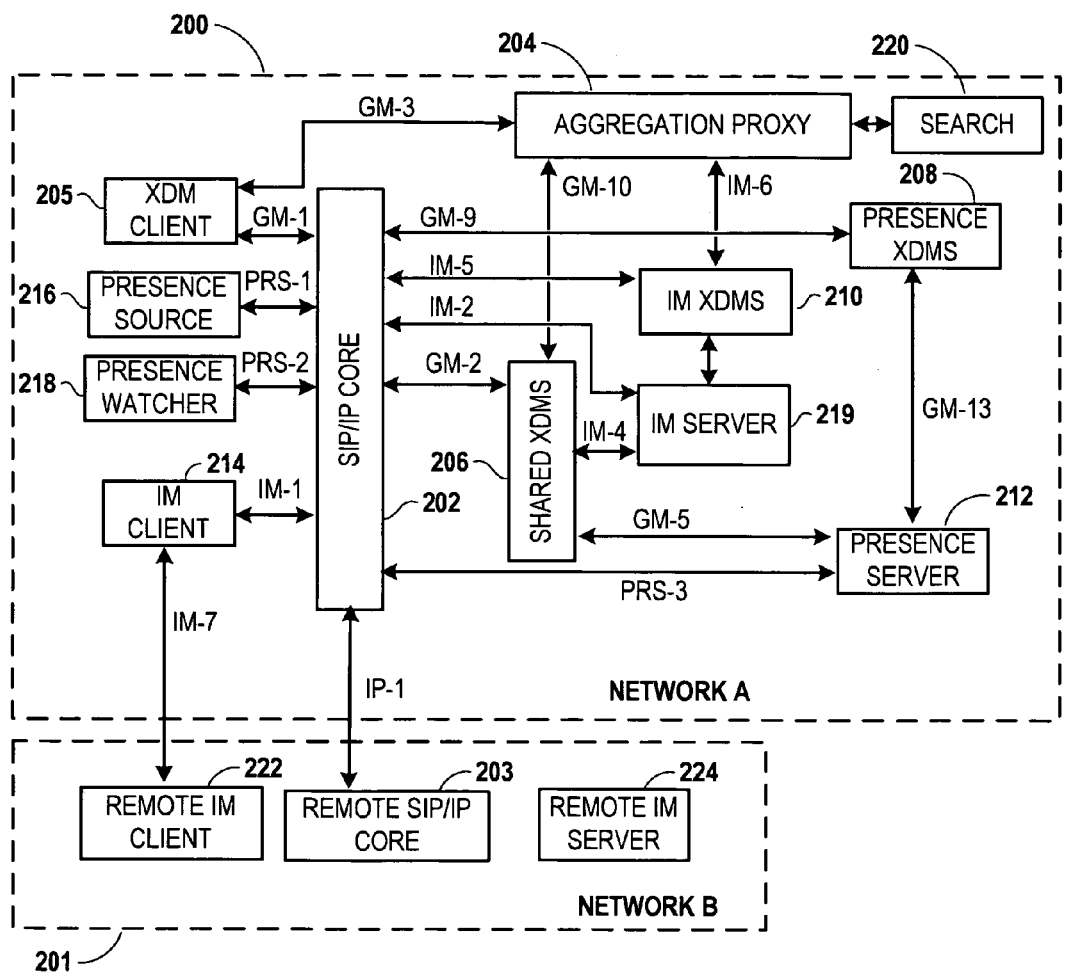
FIG. 2 is a block diagram illustrating a SIP-based instant messaging system according to an embodiment of the invention.

In reference now to FIG. 2, a block diagram illustrates a more detailed view of an OMA architecture for IM and PoC service according to an embodiment of the invention. The functional elements are shown for two networks 200, 201. Only a subset of functional elements is shown for the second network 201. A main component of the networks 200, 203 are SIP/IP cores 202, 203. The SIP/IP cores 202, 203 may provide, among other things, routing of SIP signaling, discovery and address resolution services, authentication/authorization, charging, accounting, and QoS control.

An aggregation proxy 204 acts as single contact point for an XDM client 205 to access documents stored in any of the XDMS. A shared XDMS 206 is a repository that manages XML documents (e.g., URI lists) that are needed for a particular service enabler and that may be shared with other service enablers (e.g., IM, Presence, PoC). Two repositories for specific service enablers are also illustrated the Presence XDMS 208 and the IM XDMS 210.

A presence server 212 maintains the presence status of IM clients 214. Presence relates to the availability and willingness of a presence source 216 (also referred to as a presentity) to communicate. A presence watcher 218 tracks different states of the presence source 216, and thereby can determine when the presence source 216 is willing and able to communicate.

Other functional entities of the network 200 include an IM server 219 and a search server 220. The operations of these entities 218, 220 are described in greater detail elsewhere herein. A remote IM client 222 and IM server 224 are shown in the second network 201. It will be appreciated that the networks 200, 201 may include components that are not illustrated in this example, including service enablers and data repositories related to PoC.

Figure 3:
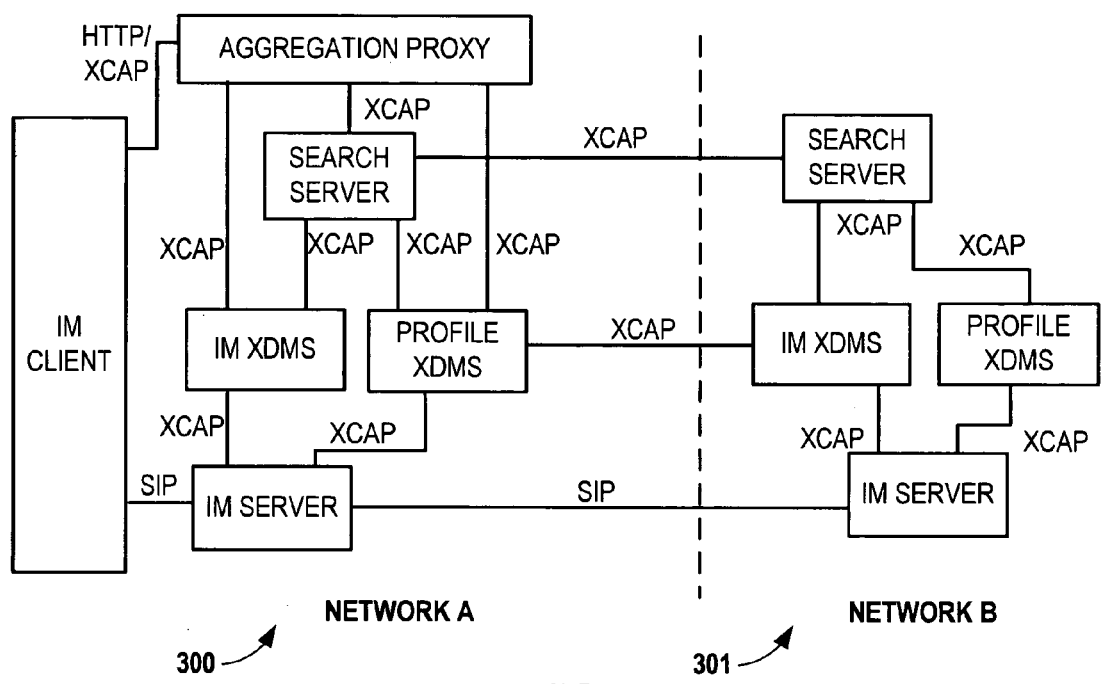
FIG. 3 is a block diagram illustrating protocols used by a SIP-based instant messaging system according to an embodiment of the invention.

In reference now to FIG. 3, a system diagram illustrates the protocols used to communicate between various entities according to embodiments of the present invention. The functional entities in FIG. 3 are analogous to those entities described in relation to FIG. 2. As in FIG. 2, the diagram of FIG. 3 encompasses two different networks, 300 and 301. Note the interconnect lines in FIG. 3 have labels indicating the protocols used in communicating between the entities. In particular, SIP is used for SIP session control for actions such as joining chat room, and XCAP can be used for data access and group management, among other things. The search operations may also use an XCAP based interface The systems such as shown in FIGS. 2 and 3 may include adaptations for checking personal characteristics of end-users and limiting group access based on those characteristics. One way to communicate these characteristics is to embed descriptive data into signaling requests and/or responses. It will be appreciated that any combination of data may be added to signaling messages by clients, servers, or other intermediary elements to one or both responses. Generally, for SIP/SIMPLE IM systems, the data can be embedded using feature tags for indicating the personal information and associated criterion for entering the group. For example, if the criterion is based on age, the age will be the personal data placed in a feature tag. The feature tag can be added to the Accept-Contact header or Contact header as defined in IETF RFC 3840 and RFC 3841.

Example feature tag names for describing age and age criterion are shown below in Listing 1. These example tags are useful because of their simplicity, however the names could be different. Similarly, a single feature tag name could be used to described both the characteristic (e.g., age) and the criterion that characteristic must meet in order to be allowed to join a group or see results of a search (e.g., age limit).

```
+age.group_limit = numeric_value
#Indicates the age limit for a group.
+age.user = numeric value
#Indicates the age of the user.
© 2005, Nokia Corporation
```

Listing 1

If +age.group_limit in Listing 1 has no value, it defaults to "TRUE", meaning the group has no special age limit. This could be needed in inter-operator domain or intercontinental service cases to solve legal issues. The values of +age.group_limit and +age.user can be stored in a capability database as contact predicates or set of features tags. RFC 3840 describes how feature set predicates are constructed and provided by a UA as Contact header field parameter to the SIP registrar to store as part of the UA capabilities during SIP registration.

User characteristics such as age can be located and accessed from network databases such as Profile XDMS, as well as any local user capabilities database. Another way of determining these capabilities is described in IETF RFC 3841. RFC 3841 provides a means for callers to express their preferences on the characteristics of the User Agent (UA) that the caller is attempting to reach. The capabilities of the target UA may be stored in a registrar. The preferences of the caller agent are then matched with the feature set provided by the targeted UA via the registrar. This assumes that a UA Server (UAS) or a proxy has access to a location service that has capabilities associated with the target UA.

One way to populate the target UA's capabilities in the registrar is to carry it in the contact header field as a feature parameter during the target UA's SIP registration. However if the UAS/proxy knows the capabilities of the user through some other means, then it may apply the same processing for the matching process. The present invention is applicable under any scenario of accessing capabilities, including where target UA capabilities is stored in the SIP Registrar, in a Profile XDMS, or any local database that can be accessed by UAS/Proxy. Generally, the Accept-Contact header field preference expression is matched with the sending user's request. In cases where the UAS/proxy gets the capabilities via the registrar, then there should be a mechanism to ensure that the feature tag (+age.user=numeric_value) that is carried in the contact header field during registration is verified and genuine.

Figure 4A:
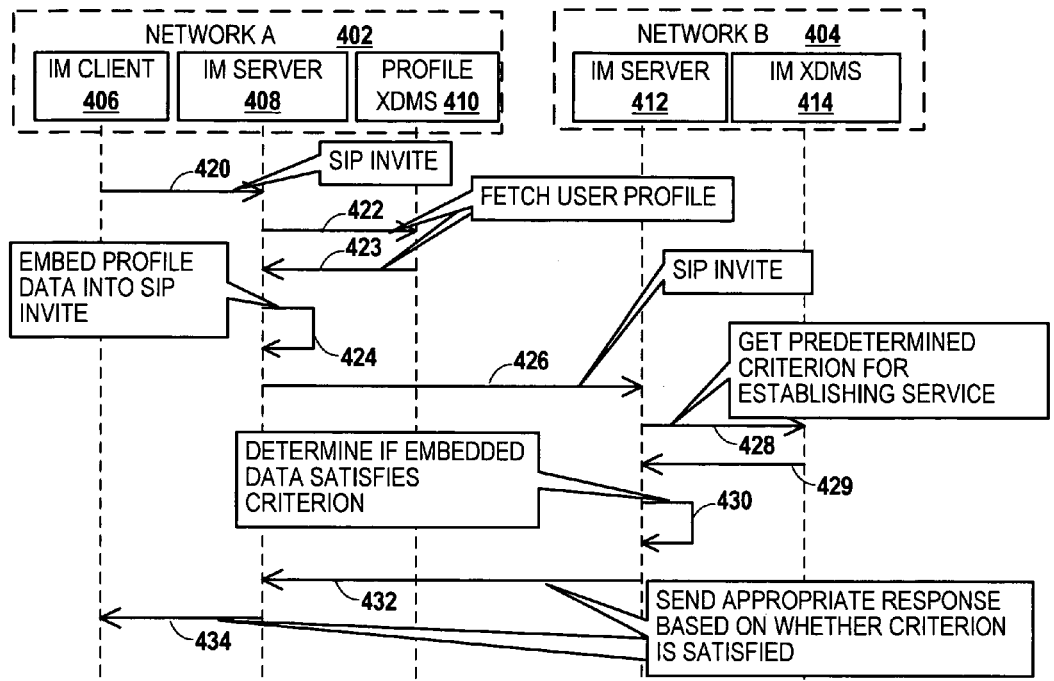
FIG. 4A is a sequence diagram illustrating local network verification of personal characteristics to determine whether a data communications session should be established according to an embodiment of the invention.
Figure 4B:
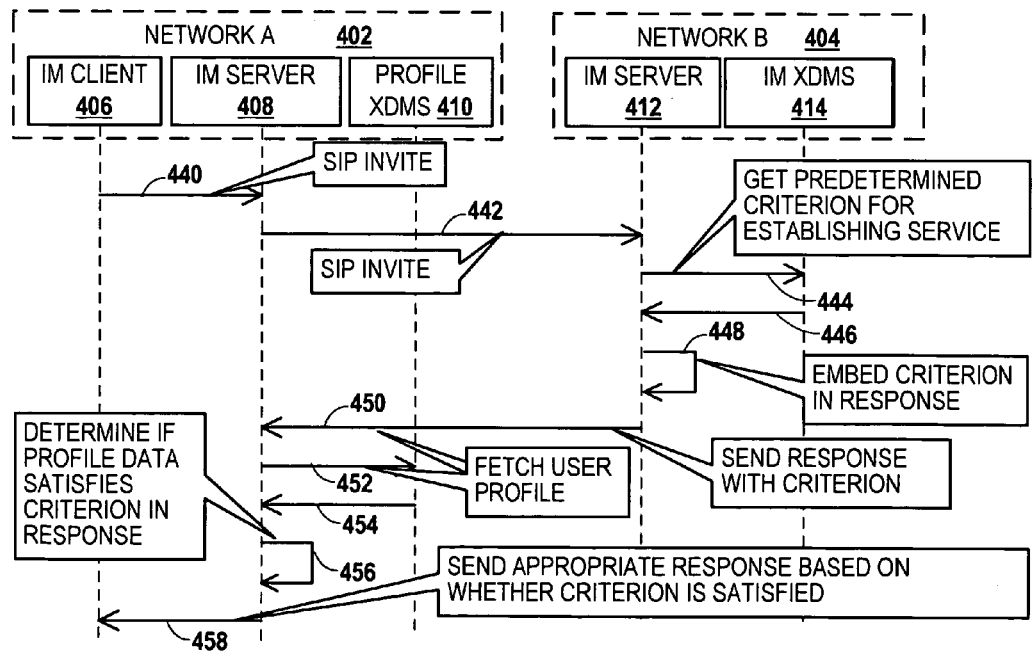
FIG. 4B is a sequence diagram illustrating remote network verification of personal characteristics to determine whether a data communications session should be established according to an embodiment of the invention.

In reference now to FIGS. 4A and 4B, sequence diagrams illustrate the use of personal information in allowing session access according to an embodiment of the present invention. The session establishment requests in FIGS. 4A and 4B span two networks, Network A 402 and Network B 404. Relevant functional entities within the networks 402, 404 share the same reference numbers in both figures, and the entities include an IM client 406, IM server 408 and Profile XDMS 410 in the first network 402, and an IM server 412 and IM XDMS 414 in the second network 404. The functions performed by these entities are described in greater detail with reference to FIGS. 2 and 3.

The sequence in FIG. 4A begins when the IM Client 406 sends a request 420 (e.g., a SIP INVITE) from Network A 402 to join a chat group that is located in Network B 404. The IM server 408 in Network A 402 fetches 422 relevant data contained in the User Profile (e.g., age information) from the Profile XDMS 410. The IM server 408 then embeds 424 the data (e.g., inserts an "age" field) into the SIP INVITE and sends 426 the modified message to the IM server 412 in Network B 404. The IM server 412 fetches 428, 429 the IM Group definition from the IM XDMS 410. The definition includes predetermined criterion (e.g., age limit) for establishing the service, which in this example is joining an IM group. The IM server 412 uses this criterion to check 430 if the user of the IM client 406 is allowed to join the chat group based on the predetermined criterion (e.g., age limit) and sends 432, 434 the appropriate response, either positive or negative, to the IM client 406 based on the results of the check 430.

As described above, the IM server 408 of the originating network 402 can embed 424 a tag containing the user's personal message in a session initiation request message (e.g., SIP INVITE). This data can be placed in the Accept-contact header field. For example, assume Alice is eighteen years old and is sending an INVITE request to a chat room from her IM client 406. An example header of this request is shown in Listing 2.

```
INVITE sip:chat_lounge@biloxi.com SIP/2.0
Via: SIP/2.0/UDP pc33.atlanta.com;branch=z9hG4bKnashds8
Max-Forwards: 70
To: Chat_lounge <sip:chat_lounge@biloxi.com>
From: Alice <sip:alice@atlanta.com>;tag=1928301774
Call-ID: a84b4c76e66710
CSeq: 314159 INVITE
Contact: <sip:alice@Atlanta.com>
Accept-contact: *; language="en,de" ;description="<PC>";+oma-sip.im
Content-Type: application/sdp
Content-Length: 142
*
*
© 2005, Nokia Corporation
```

Listing 2

The IM server 408 terminates the request and creates a similar INVITE to chat_lounge with a modified Accept-contact header. The IM server 408 may retrieve Alice's age (UA capabilities) from any combination of the Profile XDMS 410, a SIP registar, and/or any local profile server. Based on Alice's age obtained from her User Profile, the IM server 408 populates the Accept-Contact header as shown below in Listing 3. The "+age.group-limit" entry in the Accept-contact header indicates that terminating end (IM server 412) should accept the invitation only if the indicated age satisfies the age.group-limit for the chat_lounge group. For example, Alice would be allowed to join a chat room that has an age limit of eighteen years or below, but not one that has an age limit of fourteen years or below, or a limit of nineteen years and above.

```
INVITE sip: chat_lounge@biloxi.com SIP/2.0
Via: SIP/2.0/UDP im_server.atlanta.com;branch=z9hG4bKnashds8
Max-Forwards: 70
To: Chat_lounge <sip:chat_lounge@biloxi.com>
From: Alice <sip:alice@atlanta.com>;tag=1928301774
Call-ID: s09a233cbsdfglk
CSeq: 594131 INVITE
Contact: <sip:im_server@.atlanta.com>
Accept-contact: *; language="en,de";description="<PC>";+oma-sip.im;+age.group_limit<="#18"
Content-Type: application/sdp
Content-Length: 142
*
*
*
© 2005, Nokia Corporation
```

Listing 3

If the age communicated to chat_lounge chat room is above eighteen years, the IM server 412 network 404 hosting the chat room will reject 432, 434 this INVITE with a decline error code and example reason, such as "603 decline (user below the accepted age limit for this communication i.e. +age.group_limit>18)."

FIG. 4B also illustrates a request to join a group similar to that shown in FIG. 4A, except that the embedding of information and determination of acceptance is handled by different entities. In the sequence of FIG. 4B, the IM client 406 sends 440 a standard request (e.g., SIP INVITE) to join a chat group that is located in Network B 404. The IM server 408 in Network A 402 forwards 442 the request to the IM server 412 in Network B 404. The IM server 412 fetches 444, 446 the IM Group definition with predetermined criterion from the IM XDMS 410. The IM server 412 in Network B 404 determines if chat group has predetermined limitations on joining and embeds 448 appropriate data fields into response sent 450 to the IM server 408 in Network A 402. The IM server 408 fetches 452, 454 the User Profile with personal information from Profile XDMS 410. The IM server 408 determines 456 whether the user of the IM client 406 is allowed to join the chat group based on this determination 456. The IM server 408 then sends 458 the appropriate response (positive or negative) to the IM client 406.

In this scenario, when the IM server 412 hosting the chat room receives the join-in request 442 from user, it should respond 450 with "421 extension required" or with "183 session progressing." The response 450 should include an extension header that indicates the age limitation for chat room, e.g., "Contact: +age.group_limit>=18." Returning to the example where Alice desires to join chat_lounge, this would indicate that there is age limitation for joining the group. In that example, the IM server 408 in Alice's network retrieves 452, 454 Alice's age via the Profile XDMS 410 or some other profile server. If the IM server 408 determines the age limit is met, session establishment can continue. Otherwise, the originating IM server 408 terminates session establishment. In this latter case, the IM server 408 may include an Accept-Contact header into a code "421" or "183" response, indicating the required age for the user, e.g., "Accept-Contact: +age.user>=18;require."

Figure 5A:
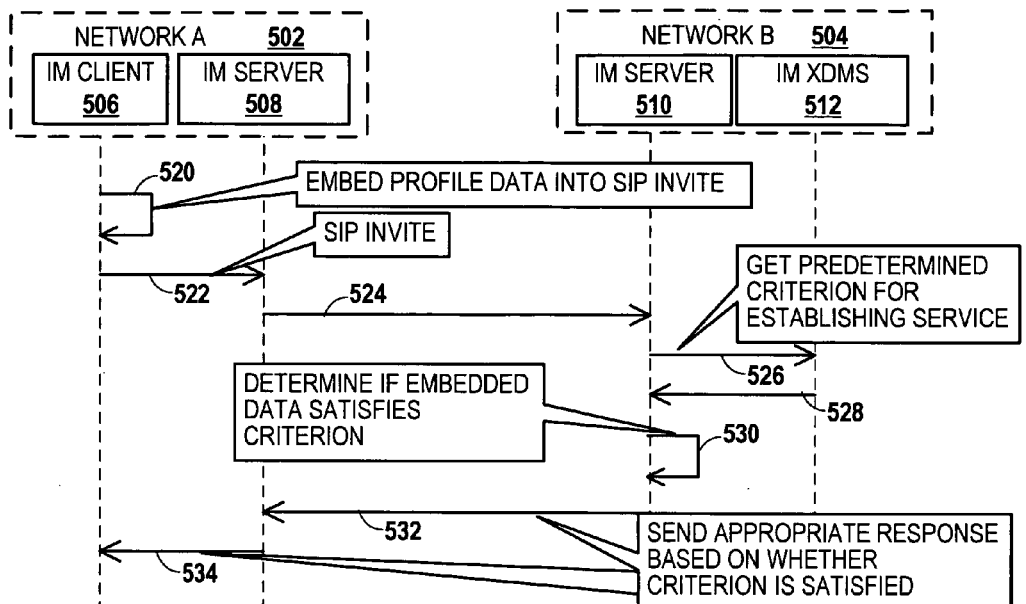
FIG. 5A is a sequence diagram illustrating originating terminal verification of personal characteristics to determine whether a data communications session should be established according to an embodiment of the invention.

Another variation of sending personal information in signaling requests to join a group according to an embodiment of the invention is shown in FIG. 5A. FIG. 5A includes Network A 502 having and IM client 506 and IM server 508, and Network B having an IM server 510 and IM XDMS 512. The IM client 506 embeds 520 a tag containing personal information (e.g., user's age) into a request message (e.g., SIP INVITE). An example tag that can be added to the Accept-Contact header for this purpose is shown below in Listing 3. The IM server 508 receives 522 this message and forwards 524 it to the IM server 510 of Network B 504 in order to join the chat group located in Network B 504. The IM server 510 in Network B 504 receives the request and fetches 526, 528 the IM Group definition with predetermined criterion for joining the group from the IM XDMS 512. The IM server 510 checks 530 to see whether the personal data embedded in the response allows the IM client 506 to join chat group, and the appropriate response is sent 532, 534 to the entities in Network A 502.

```
INVITE sip:chat_lounge@biloxi.com SIP/2.0
Via: SIP/2.0/UDP pc33.atlanta.com;branch=z9hG4bKnashds8
Max-Forwards: 70
To: Chat_lounge <sip:chat_lounge@biloxi.com>
From: Alice <sip:alice@atlanta.com>;tag=1928301774
Call-ID: a84b4c76e66710
CSeq: 314159 INVITE
Contact: <sip:alice@Atlanta.com>
Accept-contact: *; language="en,de";description="<PC>";+oma-
sip.im; +age.group_limit<="#18"
Content-Type: application/sdp
Content-Length: 142
*
*
*
*
© 2005, Nokia Corporation
```

Listing 4

The implementation shown in FIG. 5A may be more challenging to implement, in that it is necessary to prevent the IM client 506 (or other terminal software) from easily including false age information into outgoing message headers. This may require that the message 522 contain some authentication key (e.g., cryptographic token) to ensure the message has not been tampered with by the originating terminal or intermediary network entities.

Figure 5B:
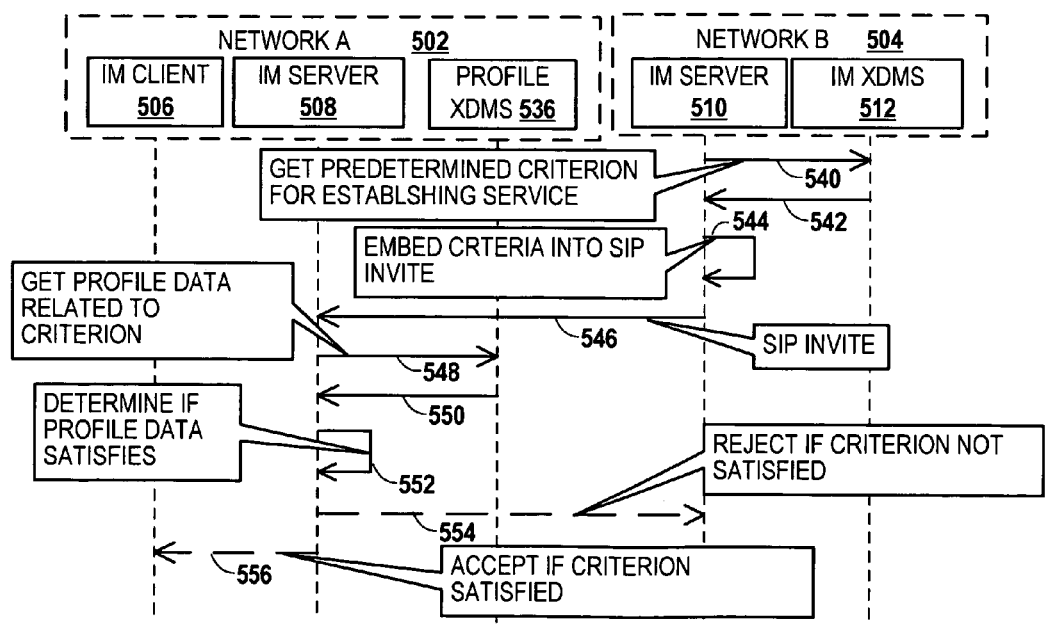
FIG. 5B is a sequence diagram illustrating verification of personal characteristics to determine whether joining a server-initiated data communications session should be allowed according to an embodiment of the invention.

It is also possible that the request to join a chat room is sent from server to terminal, such as when a user receives an invitation to join a chat room. Limiting the ability to join in that case based on age or other characteristics is also desirable. This scenario is illustrated in FIG. 5B, which includes networks 502, 504 and entities 506, 508, 510, and 512 similar to those described in relation to FIG. 5A, with the addition of a Profile XDMS 536 in Network A 502. The IM server 510 that initiates the request first gets 540, 542 the criterion for joining the group and embeds 544 the criterion in the invitation. For example, the IM server 510 may add a "+age.user age" tag in the Accept_Contact header of the invitation message. The IM server 510 then sends 546 the INVITE request to the IM server 508 on the user's network. The IM server 508 will fetch 548, 550 the related profile data via the Profile XDMS 536 (or other source). The IM server 508 then checks 552 the criterion for limiting group entry against the profile data. If the criterion is not met, then INVITE request is rejected 554. If the criterion are met, then the IM server 508 will send 556 the INVITE request to the invited user's IM client 506.

Although the examples described in relation to FIGS. 4A-B, 5A-B show embedding either personal characteristics or criterion in signaling messages, alternate implementations may not require the use of data embedded in signaling messages. In reference now to FIG. 5C, a sequence diagram illustrates example exchanges that occur independently of the signaling messages for determining personal characteristics and criterion related to those characteristics. The diagram of FIG. 5C includes networks 502, 504 and entities 506, 508, 510, 512 and 536 similar to those described in relation to FIGS. 5A-B and that share the same reference identifiers used in FIGS. 5A-B.

Figure 5C:
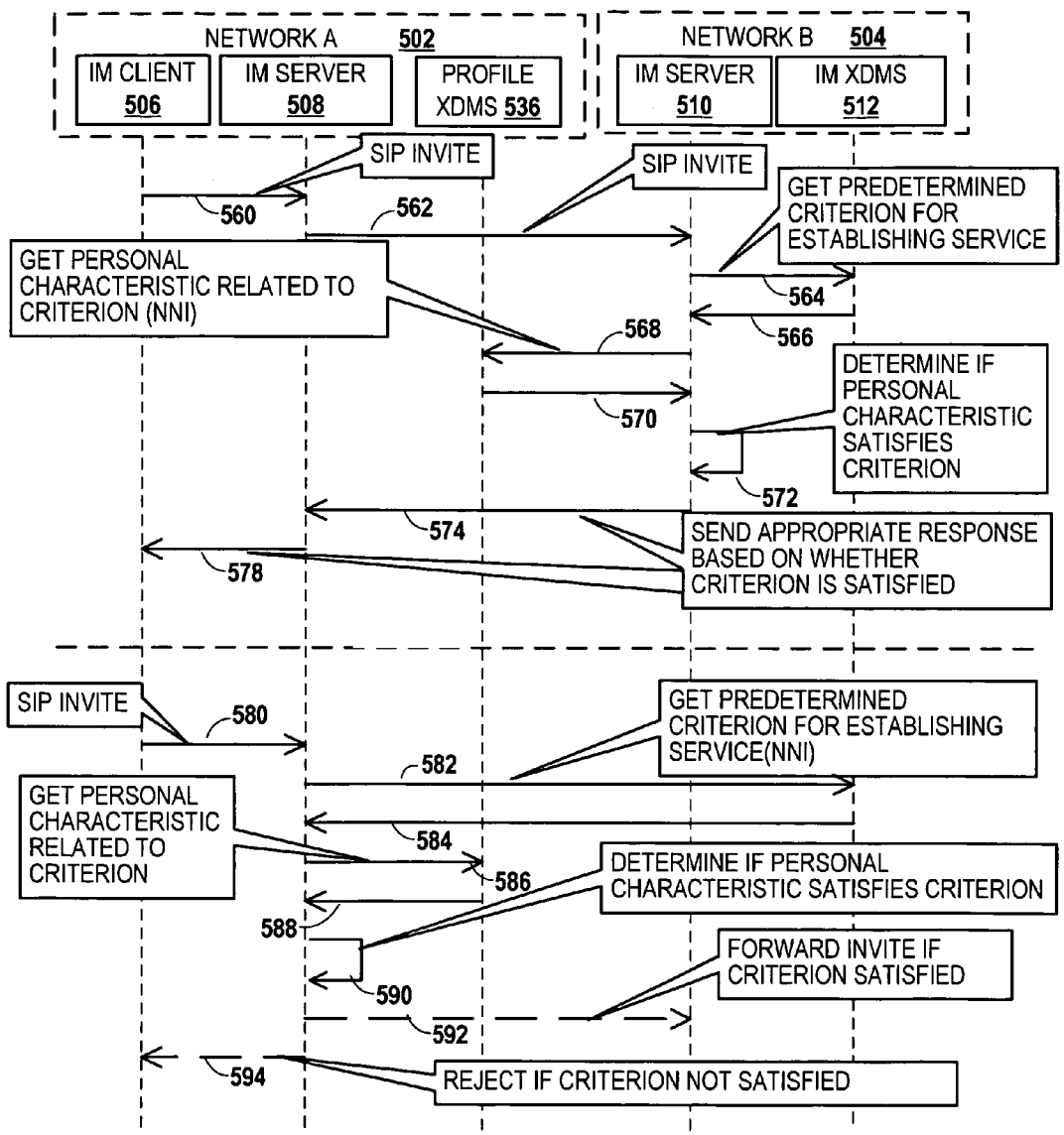
FIG. 5C is a sequence diagram illustrating verification of personal characteristics via a network-to-network interface to determine whether a data communications session should be established according to an embodiment of the invention.

In the first example of FIG. 5C, a SIP INVITE is sent 560 from the IM client 506 to the local IM server 508. The INVITE is forwarded 562 to the IM server 510 in Network B 504. The IM server 510 fetches 564, 566 the predetermined criteria (e.g., age limit) from the IM XDMS 512. The IM server 510 also fetches 568, 570 the personal characteristic related to the criterion (e.g., age) from the Profile XDMS 536 of Network A 502. Note that the IM server 510 and Profile XDMS 536 (or intermediary entities acting on their behalf) will utilize a NNI in order to perform this transaction 568, 570. Thereafter, the characteristic is verified 572 and appropriate responses (e.g., acceptance, denial) are sent 574, 578 to the originating IM server 508 and client 506.

In another example of FIG. 5C, SIP INVITE is sent 580 from the IM client 506 to the local IM server 508 as before. This time the IM server 508 locally verifies eligibility by fetching 582, 584 the predetermined criteria (e.g., age limit) from the IM XDMS 512 in Network B 504 such as via NNI. The IM server 508 also fetches 586, 588 the personal characteristic related to the criterion (e.g., age) from the Profile XDMS 536 and verifies 590 the characteristic satisfies the criterion. If the criterion is satisfied, the INVITE is forwarded 592 to the remote IM server 510, and if the criterion is not satisfied a rejection is returned 594 to the client 506.

It will be appreciated that the order and substance of transactions presented in FIGS. 4A-B, 5A-C is merely exemplary, and interactions may occur in different sequences than those illustrated. For example, in FIG. 5C, the fetching of personal characteristics 586, 588 may occur before the fetching of criterion 582, 584. Similarly, the messages may be processed by additional or alternate entities, such as proxies, mirrors, routing nodes, encoders/decoders, etc.

The examples described in relation to FIGS. 4A-B, 5A-C relate to allowing access to group sessions based on user characteristics such as age. The mechanisms described for embedding characteristics in messages are for purposes of example, and those skilled in the art will appreciate that other variations may be used to include such data, such as the placement of feature tags in Contact, Accept-Contact, and other message headers The communications sessions in FIGS. 4A, 4B, 5A were described in terms of IM groups/chat rooms, but the concepts similarly apply to related data communications sessions such as one-to-one and one-to-many ad hoc sessions, audio video teleconferencing, PoC conferencing, etc. Similarly, these solutions may be applied to signaling that occurs when searches of such communications occur. The search protocols will often operates on top of well-known protocol stacks such as HTTP. Descriptors of personal characteristics such as age could be included into HTTP headers or other search protocol headers.

Many types of apparatuses may be able communicate in point-to-point or group sessions as described herein. Mobile devices are particularly useful in this role. In reference now to FIG. 6, an example is illustrated of a representative mobile computing arrangement 600 capable of carrying out operations in accordance with embodiments of the invention. Those skilled in the art will appreciate that the exemplary mobile computing arrangement 600 is merely representative of general functions that may be associated with such mobile devices, and also that landline computing systems similarly include computing circuitry to perform such operations.

The processing unit 602 controls the basic functions of the arrangement 600. Those functions associated may be included as instructions stored in a program storage/memory 604. In one embodiment of the invention, the program modules associated with the storage/memory 604 are stored in non-volatile electrically-erasable, programmable read-only memory (EEPROM), flash read-only memory (ROM), hard-drive, etc. so that the information is not lost upon power down of the mobile terminal. The relevant software for carrying out conventional mobile terminal operations and operations in accordance with the present invention may also be transmitted to the mobile computing arrangement 600 via data signals, such as being downloaded electronically via one or more networks, such as the Internet and an intermediate wireless network(s).

The mobile computing arrangement 600 includes hardware and software components coupled to the processing/control unit 602 for performing network data exchanges. The mobile computing arrangement 600 may include multiple network interfaces for maintaining any combination of wired or wireless data connections. In particular, the illustrated mobile computing arrangement 600 includes wireless data transmission circuitry for performing network data exchanges.

This wireless circuitry includes a digital signal processor (DSP) 606 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 608, generally coupled to an antenna 610, transmits the outgoing radio signals 612 and receives the incoming radio signals 614 associated with the wireless device. The mobile computing arrangement 600 may also include an alternate network/data interface 615 such as USB, Bluetooth, Ethernet, 802.11 Wi-Fi, IRDA, etc.

The processor 602 is also coupled to user-interface elements 618 associated with the mobile terminal. The user-interface 618 of the mobile terminal may include, for example, a display 620 such as a liquid crystal display. Other user-interface mechanisms may be included in the interface 618, such as keypads 622, speakers, microphones, voice commands, switches, touch pad/screen, graphical user interface using a pointing device, trackball, joystick, etc. These and other user-interface components are coupled to the processor 602 as is known in the art.

The program storage/memory 604 typically includes operating systems for carrying out functions and applications associated with functions on the mobile computing arrangement 600. The program storage 604 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 604 of the mobile computing arrangement 600 may also include software modules for performing functions according to embodiments of the present invention.

In particular, the program storage/memory 604 may include one or more network protocol stacks 624. The protocol stack 624 contains processing layers associated with conventional Internet communications, including HTML and SIP protocol layers. It will be appreciated that the layers of the protocol stack 624 need not be separate entities, and may share common functions/libraries. Generally, the protocol stack 624 interfaces with network hardware and data bearers through low-level routines/drivers 628. These drivers 628 provide a software interface for controlling data communications hardware such as the DSP 606, transceiver 606, and alternate data interface 615.

The mobile computing arrangement 600 may also include a specialized signaling layer 630 capable of controlling the ability of network applications 632 to engage in communication with target entities 634 via a network 636. For example, the signaling module 632 may be able to determine user profile data either via a local profile database 638 or via a server on the network 636. This profile data may be used to form signaling messages containing characteristics (e.g., age) that may control whether the end user is admitted to a communications session. An authentication module 640 may ensure that the profile data is correct, and used to form special tokens to ensure the messages have not been tampered with on the arrangement 600 or elsewhere.

Figure 6:
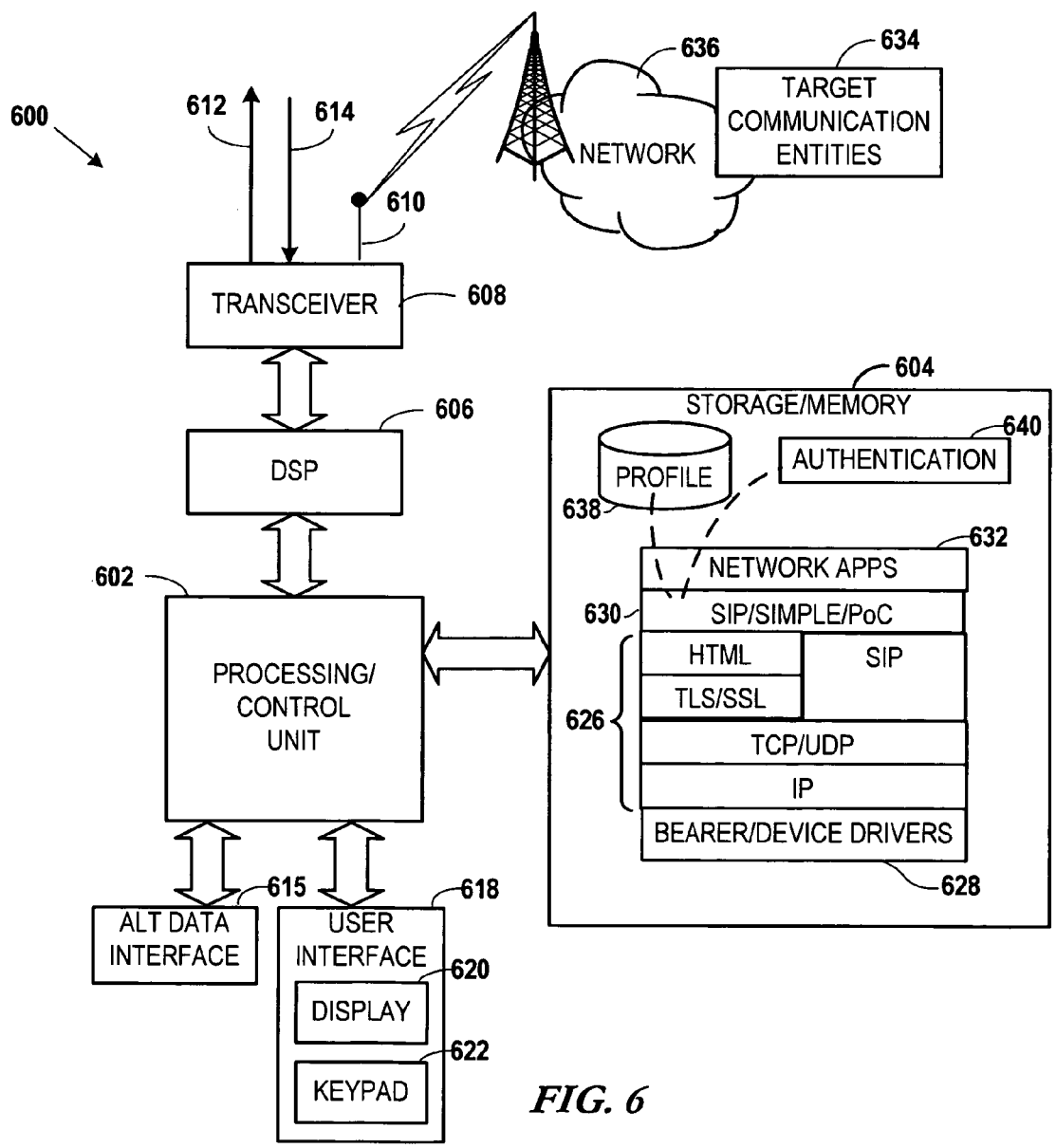
FIG. 6 is a block diagram illustrating a terminal device according to an embodiment of the invention.

The mobile computing arrangement 600 of FIG. 6 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

In order for an age limitation scheme to work, various network entities will be required to monitor signaling messages, access age criterion from the messages and profile databases, and enforce the restrictions by denying sessions or limiting search results. These functions may be provided by computing arrangements distributed across multiple communications networks. However, an example apparatus that may carry out various combinations of these functions is shown in FIG. 7.

Figure 7:
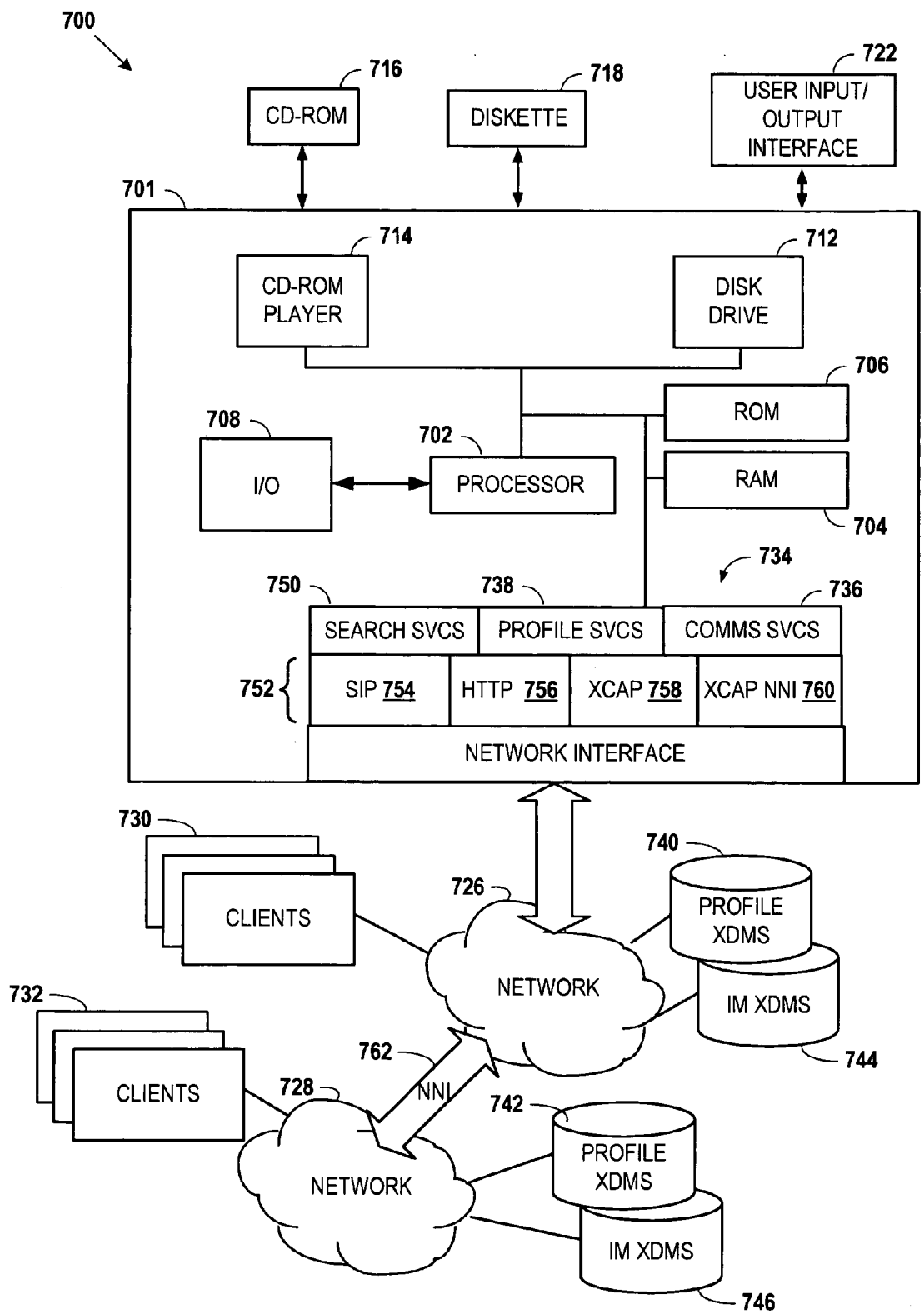
FIG. 7 is a block diagram illustrating a server device according to an embodiment of the invention.

FIG. 7 shows an example computing structure 700 suitable for providing message monitoring and access/search control according to embodiments of the present invention. The computing structure 700 includes a computing arrangement 701. The computing arrangement 701 may include custom or general-purpose electronic components. The computing arrangement 701 includes a central processor (CPU) 702 that may be coupled to random access memory (RAM) 704 and/or read-only memory (ROM) 706. The ROM 706 may include various types of storage media, such as programmable ROM (PROM), erasable PROM (EPROM), etc. The processor 702 may communicate with other internal and external components through input/output (I/O) circuitry 708. The processor 702 carries out a variety of functions as is known in the art, as dictated by software and/or firmware instructions.

The computing arrangement 701 may include one or more data storage devices, including hard and floppy disk drives 712, CD-ROM drives 714, and other hardware capable of reading and/or storing information such as DVD, etc. In one embodiment, software for carrying out the operations in accordance with the present invention may be stored and distributed on a CD-ROM 716, diskette 718 or other form of media capable of portably storing information. These storage media may be inserted into, and read by, devices such as the CD-ROM drive 714, the disk drive 712, etc. The software may also be transmitted to computing arrangement 701 via data signals, such as being downloaded electronically via a network, such as the Internet. The computing arrangement 701 may be coupled to a user input/output interface 722 for user interaction. The user input/output interface 722 may include apparatus such as a mouse, keyboard, microphone, touch pad, touch screen, voice-recognition system, monitor, LED display, LCD display, etc.

The computing arrangement 701 may be coupled to other computing devices via networks. In particular, the computing arrangement includes a network interface 724 for interacting with a local "home" network 726 and remote "foreign" networks 728. The network interface 724 may include a combination of hardware and software components, including media access circuitry, drivers, programs, and protocol modules. Ultimately, the computing arrangement 701 may affect session interactions between clients 730, 732 for purposes of limiting search and join capabilities based on personal characteristics such as age. The session interactions between clients 730, 732 may take place on a single network (e.g., network 726) or across two or more networks 726, 728.

The computing arrangement 701 includes processor executable instructions 734 for carrying out tasks of the computing arrangement 701. These instructions may include a communications services module 736 capable of providing core network services such as IM or PoC. The arrangement 701 may also include a module 738 for providing or accessing profile data. For example, the arrangement 701 may be configured as an aggregation proxy, and may access a Profile XDMS 740 in the local network 726 and/or a Profile XDMS 742 in a foreign network 728. Similarly, if the arrangement 701 includes a services module 736 for providing IM services, the arrangement 701 may access one or more IM XDMS 744, 746 on the respective networks (although for most purposes, and IM server would only need to access the local XDMS 744).

The computing arrangement may also host or utilize network search services via a search services module 750. The search service module 750 may be able to communicate with clients 730, 732 and network data repositories such as the Profile and IM XDMS 740, 742, 744, 746 in order to locate, format, and filter searches for data related to chat groups and/or end users. Generally, the intercommunications between the search module 750 (as well as the communication and profile modules 732, 738) and other network entities will require communication using standard protocols, as represented by the protocol layer 752. The protocol layer 752 may include stacks for processing SIP 754, HTTP 756, XCAP 758, and XCAP NNI 760. Generally, the XCAP NNI protocol stack 760 is configured for inter-network communications, as indicated by path 762. The other stacks 754, 756, 758 may be configured for communications via the home network, although are not strictly limited as such. The stacks of the protocol layer 752 may be configured as either or both client and server stacks where appropriate.

The computing structure 700 is only a representative example of network infrastructure hardware that can be used to provide services as described herein. Generally, the functions of the computing structure 700 can be distributed over a large number of processing and network elements, and can be integrated with other services, such as service enablers, gateways, mobile communications messaging, etc.

Figure 8:
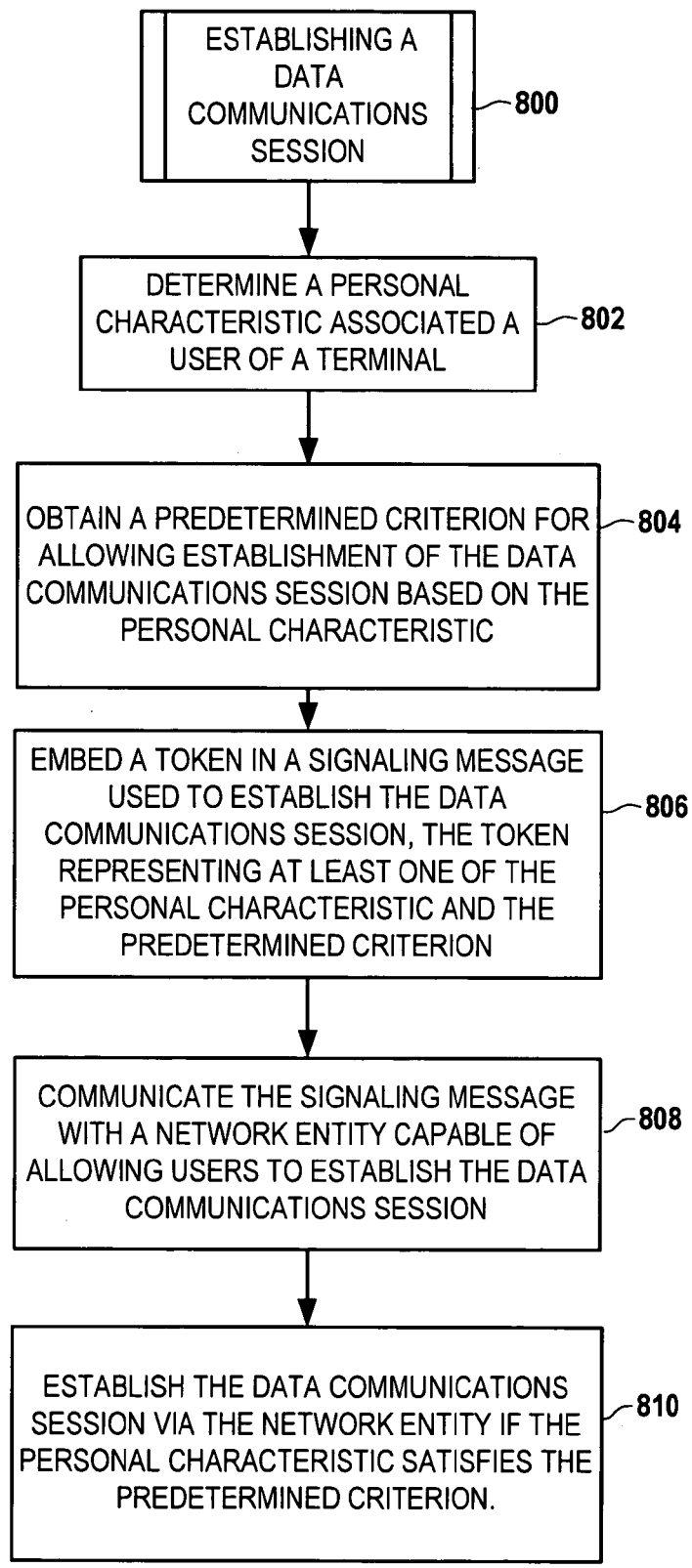
FIG. 8 is a flowchart illustrating a procedure for establishing a data communications session according to an embodiment of the invention.

In reference now to FIG. 8, a flowchart illustrates a procedure 800 for establishing a data communications session. A personal characteristic associated with a user of a terminal is determined 802, and a predetermined criterion for allowing establishment of the data communications session based on the personal characteristic is obtained 804. A token is embedded 806 in a signaling message used to establish the data communications session. The token represents at least one of the personal characteristic and the predetermined criterion the personal characteristic. For example, the token may represent an age associated with a user and/or represent an age limit associated with a communication session. The signaling message is communicated 808 with a network entity capable of allowing users to establish data communications sessions. The data communications session is established 810 via the network entity if the personal characteristic satisfies the predetermined criterion.

Figure 9:
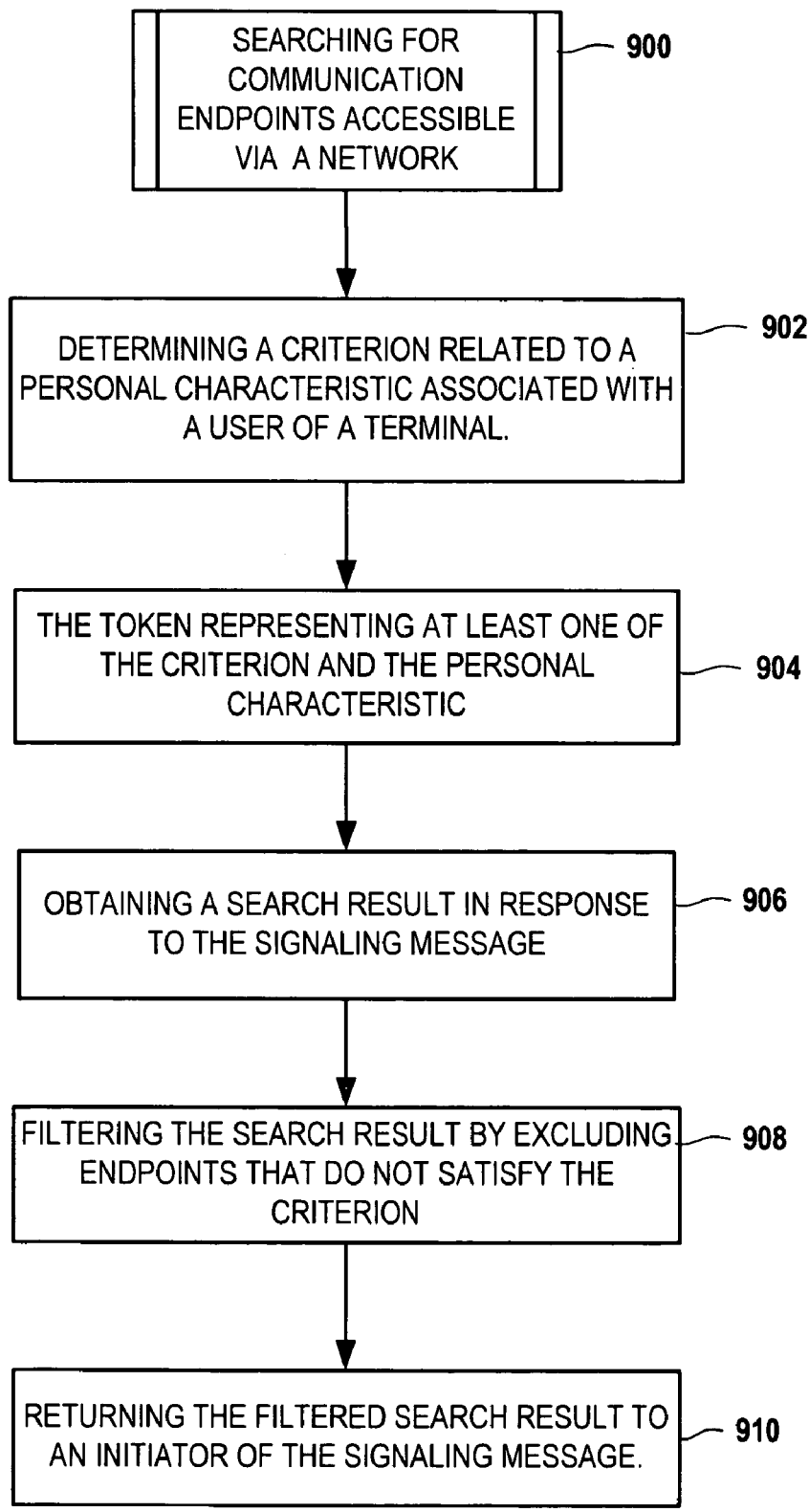
FIG. 9 is a flowchart illustrating a procedure for performing a network search according to an embodiment of the invention.

In reference now to FIG. 9, a flowchart illustrates a procedure 900 for searching for communication endpoints accessible via a network. A criterion related to a personal characteristic of a user is determined 902. A token is embedded 904 in a signaling message used to initiate the search. The token represents at least one of the criterion and the personal characteristic. A search result is obtained in response to the signaling message. The search result is filtered 908 by excluding endpoints referenced in the search result that do not satisfy the criterion. The filtered search result is returned 910 to an initiator of the signaling message.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
   causing at least in part, intercepting, by an intermediary service element, a signaling message sent by a terminal to a network entity to establish a data communications session using a session establishment protocol;
   identifying, via a profile database associated with the session establishment protocol, personal characteristic associated with user of the terminal, wherein the personal characteristic describes an intrinsic attribute of the user;
   obtaining, via a policy database that stores a group access policy relating to the establishment of communications sessions with the network entity, a predetermined criterion for allowing establishment of the data communications session based on the personal characteristic satisfying the group access policy;
   causing, at least in part, embedding, via the intermediary service element, a token in the signaling message, the token representing at least one of the personal characteristic and the predetermined criterion;
   causing, at least in part, communicating the signaling message via a network service element capable of allowing the user to establish the data communications session, wherein the network service element establishes the data communications session if the personal characteristic satisfies the predetermined criterion.

2. The method of claim 1, wherein the personal characteristic comprises the user's age.

3. The method of claim 1, wherein the profile database comprises a network accessible user profile database.

4. The method of claim 1, wherein the embedding of the token in the signaling message comprises embedding the token in a header of a Session Initiation Protocol (SIP) message.

5. The method of claim 4, wherein the embedding of the token in the SIP message comprises embedding the token in at least one of an Accept-Contact and a Contact header of a SIP INVITE message.

6. The method of claim 1, wherein the establishment of the data communications session comprises allowing membership into an instant messaging group.

7. The method of claim 1, wherein the establishing the data communications session comprises allowing membership into a push-to-talk communications group.

8. The method of claim 1, wherein the establishing the data communications session comprises establishing the data communications session between two or more users.

9. A method comprising:
   determining a criterion for allowing a user to join a group via a data communication session in accordance with a group access policy, wherein the criterion is related to a personal characteristic of the user, wherein the personal characteristic describes an intrinsic attribute of the user;
   causing, at least in part, obtaining a search result in response to a signaling message, wherein the signaling message is used to initiate a search for session endpoints and includes an embedded token representing at least one of the criterion and the personal characteristic;
   filtering the search result by excluding particular session endpoints referenced in the search results, wherein the particular session endpoints are associated with members of the group who do not satisfy the criterion; and
   causing, at least in part, returning the filtered search result to an initiator of the signaling message.

10. The method of claim 9, wherein the personal characteristic comprises the user's age.

11. The method of claim 9, further comprising obtaining at least one of the criterion and the personal characteristic from a network accessible user profile database associated with a session protocol of the communication session.

12. The method of claim 9, wherein the embedding of the criterion in the signaling message comprises intercepting the signaling message at an intermediary server and embedding the criterion in the signaling message via the intermediary server.

13. An apparatus comprising:
   at least one memory including computer program instructions; and
   a processor,
   the at least one memory and the computer program instructions configured to, with the processor, cause the apparatus to perform at least the following:
   intercept a signaling message sent from a terminal to a network entity via a network to establish a data communication session between the terminal and the network entity using a session establishment protocol;
   retrieve from the signaling message at least one of a personal characteristic of a user of the terminal and a predetermined criterion of a group access policy related to the personal characteristic, wherein the personal characteristic is obtained via a profile database associated with the session establishment protocol and describes an intrinsic attribute of the user; and
   facilitate establishing the data communication session in response to the signaling message based on whether the personal characteristic satisfies the predetermined criterion in accordance with the group access policy.

14. The apparatus of claim 13, wherein the personal characteristic of the user comprises the age of the user.

15. The apparatus of claim 13, wherein the apparatus is further caused to establish an instant messaging session between the terminal and the network entity in response to the signaling message if the personal characteristic satisfies the predetermined criterion.

16. The apparatus of claim 13, wherein the apparatus is further caused to to establish a push-to-talk session between the terminal and the network entity in response to the signaling message if the personal characteristic satisfies the predetermined criterion.

17. The apparatus of claim 13, wherein the apparatus is further caused to:
   provide a search result containing descriptions of individual communication endpoints accessible via the network in response to the signaling message; and
   filter individual descriptions of the search result based on whether the descriptions satisfy the predetermined criterion.

18. The apparatus of claim 13, wherein the signaling message includes the predetermined criterion, and wherein the apparatus is further caused to determine the personal characteristic via a user profile database associated with the session establishment protocol accessible via the network.

19. The apparatus of claim 13, wherein the signaling message includes the personal characteristic, and wherein the apparatus is further caused to obtain the predetermined criterion via a database.

20. A method comprising:
   causing, at least in part, intercepting a session establishment signaling message by an intermediary network entity, wherein the signaling message is included in a service request initiated by a client device operable on a first network, wherein the signaling message targeted for a service element of a second network to establish a data communications session with an communication endpoint of the second network using a session establishment protocol;
   accessing a personal characteristic of a user of the client device via a profile database of the first network associated with the session establishment protocol in response to the service request, wherein the personal characteristic describes an intrinsic attribute of the user;
   accessing a criterion for allowing establishment of services via the service element from a database of the second network that stores a group access policy relating to the establishment of communications sessions via the service element; and
   establishing the data communications session via the intermediary entity based on whether the personal characteristic satisfies the criterion.

21. A non-transitory computer readable storage medium carrying one or more instructions which, when executed by a processor, cause an apparatus to at least perform the following steps:
   causing, at least in part, intercept a signaling message sent from a terminal to a network entity to establish a data communication session between the terminal and the network entity using a session establishment protocol;
   retrieve from the signaling message at least one of a personal characteristic of a user of the terminal and a predetermined criterion of a group access policy related to the personal characteristic, wherein the personal characteristic is obtained via a profile database associated with the session establishment protocol and describes an intrinsic attribute of the user; and
   causing, at least in part, facilitate establishing the data communication session in response to the signaling message based on whether the personal characteristic satisfies the predetermined criterion in accordance with the group access policy.

22. The non-transitory computer readable storage medium of claim 21, wherein the personal characteristic of the user comprises the age of the user.

23. The non-transitory computer readable storage medium of claim 21, wherein the instructions further cause, at least in part, the apparatus to establish an instant messaging session between the terminal and the network entity via an instant messaging server module in response to the signaling message if the personal characteristic satisfies the predetermined criterion.

24. The non-transitory computer readable storage medium of claim 21, wherein the instructions further cause, at least in part, the apparatus to establish a push-to-talk session between the terminal and the network entity via a push-to-talk server module in response to the signaling message if the personal characteristic satisfies the predetermined criterion.

25. The non-transitory computer readable storage medium of claim 21, wherein the instructions further cause the apparatus to:
provide a search result containing descriptions of individual communication endpoints accessible via the network in response to the signaling message; and
filter individual descriptions of the search result based on whether the descriptions satisfy the predetermined criterion.

26. The non-transitory computer readable storage medium of claim 21, wherein the signaling message includes the predetermined criterion, and wherein the instructions cause the apparatus to determine the personal characteristic via a user profile database associated with the session establishment protocol accessible via the network.

* * * * *